Figure 1:
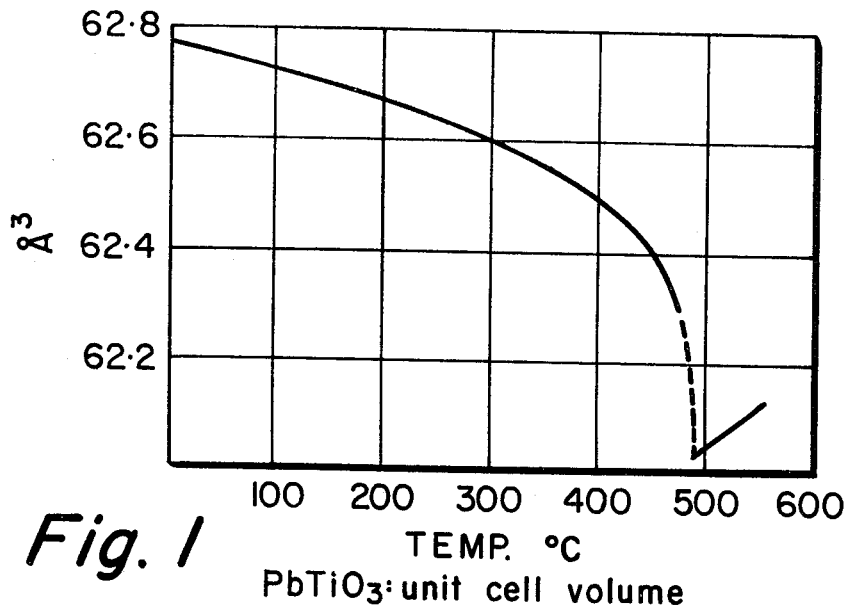

PbTiO₃: unit cell volume

INVENTOR.
Francis W. Martin
BY
Clinton S. Janes, Jr.
ATTORNEY

United States Patent
Martin

[15] 3,663,244
[45] May 16, 1972

[54] HIGH DURABILITY LEAD TITANATE-CONTAINING ENAMEL FOR GLASS CERAMICS

[72] Inventor: Francis Willis Martin, Painted Post, N.Y.
[73] Assignee: Corning Glass Works, Corning, N.Y.
[22] Filed: Apr. 28, 1970
[21] Appl. No.: 32,563

[52] U.S. Cl. ..........................106/49, 106/39 DV, 117/125
[51] Int. Cl. ...................................................C03c 5/02
[58] Field of Search..............106/39 DV, 49, 45, 53; 117/23, 117/125, 129

[56] References Cited

UNITED STATES PATENTS

| | | | |
|---|---|---|---|
| 3,486,871 | 12/1969 | Martin | 106/53 X |
| 3,410,674 | 11/1968 | Martin | 65/33 |
| 3,405,002 | 10/1968 | Martin | 117/128 |
| 2,956,219 | 10/1960 | Cianchi | 106/39 DV |

Primary Examiner—Tobias E. Levow
Assistant Examiner—W. R. Satterfield
Attorney—Clarence R. Patty, Jr. and Clinton S. Janes, Jr.

[57] ABSTRACT

This invention relates to a method of making and applying a thermally devitrifiable glass enamel for decorating or protecting glass-ceramic ware which has a high resistance to acid and alkaline attack and improved resistance to impact and abrasion.

2 Claims, 2 Drawing Figures

HIGH DURABILITY LEAD TITANATE-CONTAINING ENAMEL FOR GLASS CERAMICS

In the glass-ceramic industry, enamels are typically applied to glass-ceramic articles after manufacture for the purposes of decoration and protection. These enamels must be durable enough to withstand physical abuse, thermal shock, and chemical attack, and often consist of glass materials which are ground into a powder or frit, mixed with a suitable vehicle, applied to the articles, and then firmly bonded thereto by a heat treatment which fluxes the frit into a smooth glaze integral with the glass-ceramic substrate.

There are several problems which must be faced in connection with the use of the glass enamel approach to ceramic ware glazing. The first is that glass enamels applied by ordinary methods do not bond well with glass-ceramics to which they are applied. One reason for this is that it is difficult to formulate an enamel composition which will result in a glass with a coefficient of thermal expansion low enough to match the coefficient of expansion of typical glass-ceramic materials. Coefficient of expansion as used here means the factor by which a sample of glass material increases in length as its temperature is raised one centigrade degree. It is customarily expressed in the glass industry as the average coefficient per degree over the range from 0°–300° C. and will be so expressed whenever referred to herein. Glass enamel frits commercially available have average coefficients of expansion on the order of $80-120 \times 10^{-7}/°C$. between 0° and 300° C., whereas the typical glass-ceramic materials employed as culinary ware have coefficients of expansion of about $0-30 \times 10^{-7}/AL$ C. As a result, if such a glazing material is applied to a glass-ceramic article and then heated to fuse or mature the glaze, the enamel will shrink much faster than the ceramic substrate as the enameled article is cooled to room temperature. This expansion mismatch puts the glass-ceramic substrate under compression and the enamel coating under tension, causing cracking or checking in the enamel and producing a poorly adhering enamel.

The most effective approach to this problem has been the formulation of thermally devitrifiable glass frits which are converted to a highly crystalline structure as they are heated to mature the glaze. Such compositions, once crystallized, have generally lower coefficients of expansion than do enamels of ordinary glass, and the stresses produced by the process of cooling such enameled glass articles to room temperature after maturing the glazes are correspondingly less. U.S. Pat. No. 3,488,216 teaches some lead-titanate glass compositions in which crystallization commences substantially immediately upon heating the frit to its maturing temperature, so that a lead titanate crystalline phase constituting about 60 percent of the devitrified glaze is formed. This results in a glaze having an average coefficient of thermal expansion of about $46 \times 10^{-7}/°C$., which is shown to be more suitable than previous enamels for glazing borosilicate glassware having a coefficient of thermal expansion of about $35 \times 10^{-7}/°C$.

However, enamels so produced are still not closely matched to glass ceramics, which may have coefficients of thermal expansion near $0 \times 10^{-7}/°C$., and in addition are found to have a rather low resistance to certain kinds of chemical attack. This low resistance to chemical attack is a second problem which must be faced, particularly where such lead-containing glazes are used for decorating or protecting glass-ceramic kitchenware to be employed in the preparation or storage of comestibles. For such applications it would be desirable to employ enamels with very high resistance to both acidic and alkaline attack even at elevated temperatures. Such enamels should also possess good impact and abrasion resistance.

The primary purpose of this invention is to provide compositions and methods for making and applying a thermally devitrifiable glass enamel which will have improved chemical and physical durability for glass-ceramic kitchenware applications.

Figure 2:
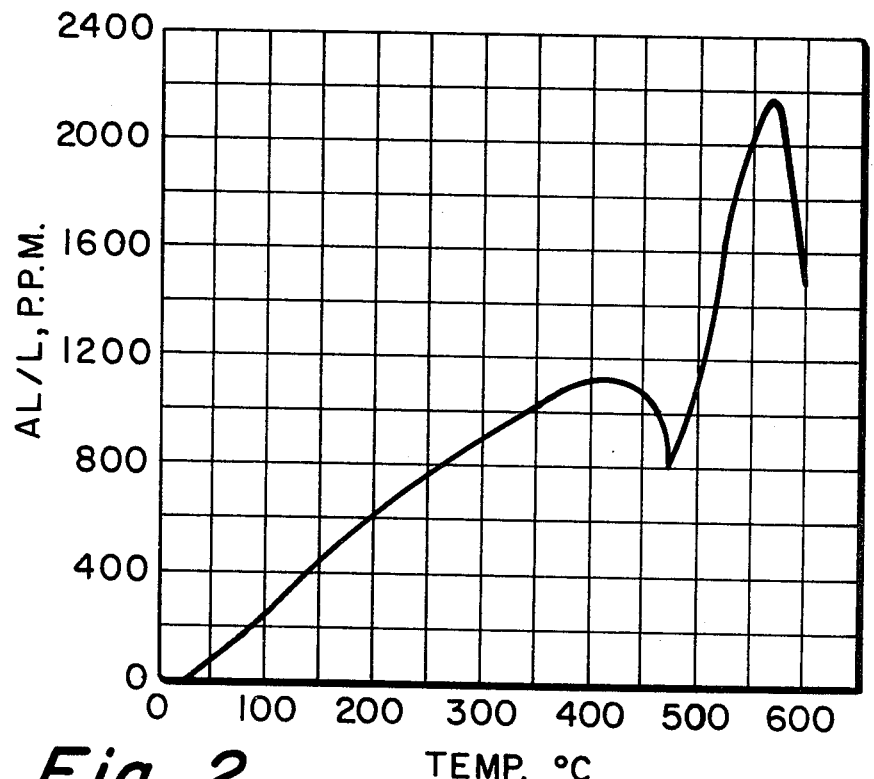

Other purposes of this invention will become apparent from the following description thereof and the appended drawings wherein:

FIG. 1 represents a plot of the volume change of a unit cell of perovskite-type lead titanate crystals; and FIG. 2 depicts the change in length exhibited by the enamels of the instant invention at various temperatures.

I have discovered certain compositions of $PbO\text{-}TiO_2\text{-}Al_2O_3\text{-}SiO_2$ glasses which can be devitrified to yield lead titanate-containing enamels of very high chemical durability and very low thermal expansion ($15-30 \times 10^{-7}/°$ C. over the range 0°–300 C.) which are exactly suited to applications in the field of glass-ceramic ware. These enamels depend for their low expansivity, with consequent tight enamel-substrate bonding and physical durability, on the formation during devitrification of a lead titanate crystalline phase, identified through X-ray diffraction analysis as having a perovskite-type structure, which is in contrast to the cubic crystalline structure of previous lead titanate-containing glazes. Lead titanate crystals of the perovskite-type demonstrate the rather unusual characteristics of contracting rather than expanding when heated within a certain range of temperatures. Thus, they exhibit linear shrinkage when heated over the temperature range of between 0° and 475° C. This contraction with increasing temperature is shown by FIG. 1 of the drawing, which is a plot of the volume of a unit cell of perovskite-type lead titanate at various temperatures. The plot indicates that the volume of the unit cell decreases from about 62.8 cubic angstroms to about 62 cubic angstroms as the temperature is taken from 0° to 475° C. The effect of this contraction with temperature on one of the typical glass enamels of my invention is shown in FIG. 2 of the drawing, which is a plot of the increase in length in parts per million of a glass enamel sample having the composition of Example II of Table I herein, as the temperature is increased from 0° to 600° C. The plot shows that the sample is actually contracting rather than expanding at temperatures from 400° to 475° C. and that it exhibits a coefficient of expansion of about $28 \times 10^{-7}/°$ C. between 0°–400° C. as a consequence of the contracting perovskite lead titanate crystalline phase of the enamel. The result is that the glass enamels of this invention have thermal expansions on the order of about $15-30 \times 10^{-7}/°$ C. as compared to about $46 \times 10^{-7}/°$ C. for previous lead titanate-containing devitrified enamels. Because the enamels of my invention have coefficients of expansion very close to those of glass-ceramic ware, the stresses developed upon cooling the enameled ware are minimized and the enamel-to-glass-ceramic bonding is improved. No checking or cracking of either the enamel or the glass-ceramic substrate is observed and the finished product exhibits greatly improved resistance to scuffing, chipping, cracking, and abrasion.

I have also discovered that these perovskite-type lead titanate-containing glasses can be formulated to yield devitrified enamels which have much greater resistance to acidic and alkaline attack than previous lead titanate-containing glazes. This resistance to chemical attack is particularly desirable in glass-ceramic kitchenware applications where sanitary, stainless, readily-washable glazes must be employed. Chemical stability is especially important when the glazes to be used in such applications contain lead.

More specifically, my invention comprises compositions of thermally devitrifiable lead titanate-containing glasses in the $PbO\text{-}TiO_2\text{-}Al_2O_3\text{-}SiO_2$ composition system which consist essentially, in weight percent on the oxide basis as calculated from the batch, of 62–68% PbO, 12–16% $TiO_2$, 14–20% $SiO_2$, 2–4% $Al_2O_3$. The glasses may also contain 0–2% CaO, 0–1% $Fe_2O_3$, and 0–1% C.O. In some instances it may be desirable to add 0–4% $SnO_2$, but when this is done the amount of $SiO_2$ may be reduced proportionately.

It should be noted that the amounts of $SiO_2$ and $Al_2O_3$ specified here are generally higher than the amounts found useful in previous lead titanate-containing glazes, while the amount of PbO is generally lower. These adjustments are required to attain the desired stability under the action of acids and bases. It is found that amounts of lead oxide in excess of the amounts specified have resulted in poor acid durability, and that the higher silica content is very effective in increasing resistance to all kinds of chemical attack. Glasses containing less than 2% by weight of $Al_2O_3$ yield less durable, higher expansion glazes, while glazes containing $Al_2O_3$ in excess of about 4% by weight show decreased acid and alkali resistance. Additions of up to 2% by weight of CaO can produce increased alkaline resistance without a corresponding increase in the expansivity of the glaze, while the additions of up to 4% $SnO_2$ as a substitute for an equivalent amount of $SiO_2$ makes the resulting glaze less reactive with respect to the substrate during heat treatment. This addition also makes the enamel less sensitive to the deleterious effects of pigments such as $Fe_2O_3$ and CoO which tend to increase the coefficient of expansion of glazes in which they are present in excessive amounts. Finally, whereas the use of such additions as $B_2O_3$, ZnO, BaO, $P_2O_5$, the alkali metal oxides and metallic fluorides is not recommended, since these constituents are highly fluxing and markedly decrease the chemical durability of enamels in which they are present, it is found that not more than a total of 2% by weight of these additions may be tolerated at the expense of durability to control the expansivity of the resultant enamels.

Frits of the compositions disclosed herein may be prepared by melting the glasses in the conventional manner in platinum crucibles or continuous melting units at temperatures between about 1,200° and 1,300° C., for about 2 hours, and then quenching the melts and grinding them into powder. The ground glass is then mixed with a suitable vehicle to form a slip or suspension and applied to the ceramic ware by silk-screening or other conventional techniques. The enamel thus prepared is rather insensitive to coating thickness and may be applied to produce glazes up to about 4 mils thick in a single application.

The coated ware is then dried and heated to a temperature between 700° and 850° C. for a time sufficient to mature the frit to a glaze with the simultaneous in situ devitrification therein of a lead titanate phase having a perovskite-type structure. In general, operable times range from about 15 minutes to 1 hour, in order to simultaneously devitrify, mature, and bond the glaze to the surface of the glass-ceramic material. Of course, longer heat treatments will still yield a desirable product, but such treatment is of no particular benefit and is thus not deemed commercially practicable. It should be noted that the temperatures useful in the present invention are substantially higher than those disclosed in previous inventions employing lead titanate glazes. These high temperatures are used primarily because they are necessary to soften and mature the durable, high silica glazes of this invention which do not utilize the fluxing agents of less chemically durable enamels. The high temperatures are also found useful in encouraging the growth of the low expansion perovskite-type lead titanate phase. It is found that heat treatment of the glazes of this invention at about 750° C. for about one-half hour produces a good flux, satisfactory devitrification, and good bonding without the development of a reaction layer between the enamel and the glass-ceramic ware which noticeably decreases the strength of the finished article. Temperatures above those specified herein can result in objectionable interactions between the enamel and the glass substrate, while temperatures below those specified will result in incomplete fluxing of the frit into a glaze.

Table I further describes the invention by way of several specific embodiments thereof, expressed in percent composition by weight on the oxide basis as calculated from the batch.

TABLE I

|  | 1 | 2 | 3 | 4 | 5 | 6 | 7 | 8 | 9 | 10 | 11 | 12 |
|---|---|---|---|---|---|---|---|---|---|---|---|---|
| PbO | 64 | 66 | 68 | 66 | 64 | 62 | 66 | 65 | 68 | 64 | 64 | 64 |
| $TiO_2$ | 16 | 16 | 16 | 14 | 14 | 14 | 14 | 14 | 12 | 12 | 16 | 16 |
| $Al_2O_3$ | 2 | 2 | 2 | 3 | 2 | 4 | 3 | 3 | 2 | 4 | 2 | 4 |
| $SiO_2$ | 18 | 15 | 14 | 17 | 16 | 20 | 17 | 17 | 18 | 20 | 16 | 16 |
| $SnO_2$ |  |  |  |  |  |  |  | 4 |  |  |  |  |
| $Fe_2O_3$ |  |  |  |  | 0.5 |  |  |  |  |  |  |  |
| CaO |  |  |  |  |  |  |  |  |  | 1 |  |  |
| $B_2O_3$ |  | 1 |  |  |  |  |  |  |  |  |  | 2 |

The chemical durability of the devitrified enamels of the invention was tested by preparing frits of the above compositions according to the conventional techniques outlined above, applying them in the form of slips to two inch square glass-ceramic chips, drying the chips and heat treating them at temperatures ranging from 700°–750° C. for one-half hour to mature the glazes. These chips, together with similar chips glazed with earlier lead titanate-containing enamels were then weighed, subjected to boiling 5% nitric acid for 1 ½ hours, and finally re-weighed. The weight losses of the chips glazed with enamels of the invention were then compared to the weight losses of some chips glazed with earlier lead titanate-containing glazes.

Table II gives the results of such a test in which the effects of silica and alumina content on chemical durability are indicated.

TABLE II

|  | 13 | 14 | 15 | 10 | 16 |
|---|---|---|---|---|---|
| PbO | 64 | 64 | 64 | 64 | 64 |
| $TiO_2$ | 16 | 12 | 12 | 12 | 12 |
| $Al_2O_3$ |  |  | 2 | 4 | 6 |
| $SiO_2$ | 20 | 24 | 22 | 20 | 18 |
| Weight loss (mg.) | 25.6 | 116.6 | 8.9 | 2.4 | 45.5 |

In connection with Table II it should be noted that since the primary object of my research was to produce a durable low expansion glaze for glass-ceramic applications, wherein the usual limitations on glaze firing temperatures were considerably extended, it was assumed that the elimination of such constituents as $B_2O_3$ and ZnO which have a deleterious effect on acid durability, together with the utilization of $SiO_2$ concentrations higher than found in previous glazes, would result in glazes satisfactory for such applications. Unexpectedly, however, it was discovered that as the silica content was increased above about 20 percent by weight, the acid durability actually declined. It was eventually also discovered that a certain minimum alumina level vastly improved acid durability, and that durability was again poor at levels of alumina above about 4 percent by weight. The same was found true with regard to alkali durability.

Table III gives the results of a similar test in which the effect of lead oxide content on chemical durability is indicated.

TABLE III

|  | 17 | 18 | 19 | 3 | 1 | 20 |
|---|---|---|---|---|---|---|
| PbO | 72 | 70 | 69 | 68 | 64 | 60 |
| $TiO_2$ | 16 | 16 | 17 | 16 | 16 | 20 |
| $Al_2O_3$ | 2 | 2 | 2 | 2 | 2 | 4 |
| $SiO_2$ | 10 | 12 | 12 | 14 | 18 | 16 |
| Weight loss (mg.) | 156.1 | 50.5 | 43.8 | 2.5 | 0.3 | 23.0 |

In this connection it was assumed that as the lead oxide content was decreased and the silica content increased, more durable enamels would result. It was discovered, however, that as the PbO content was decreased below certain minimum levels poor results were obtained. There is some evidence that glasses with a PbO content below about 62 percent by weight do not melt to a homogeneous glass but are initially phase separated prior to devitrification in the firing cycle.

In glass-ceramic cookware applications, for which the glazes of my invention are intended, it is also important that the tendency of the glazes to release lead under chemical attack be strictly controlled. Lead release by the glazes of my invention may be compared to the lead release of previous lead-titanate-containing glazes through the employment of a test in which enameled chips substantially the same as those previously described are placed in boiling 5% acetic acid solutions for one-half hour, and the lead concentrations in the solutions then determined. Table IV indicates the results of such a test, in which the effects of various constituents on lead release under acidic attack are indicated.

TABLE IV

| | 1 | 10 | 12 | 21 | 22 | 23 | 24 | 25 |
|---|---|---|---|---|---|---|---|---|
| PbO | 64 | 64 | 64 | 69 | 69 | 70 | 66 | 63 |
| TiO$_2$ | 16 | 12 | 16 | 20 | 22 | 20 | 20 | 13 |
| Al$_2$O$_3$ | 2 | 4 | 4 | | | | | 2 |
| SiO$_2$ | 18 | 20 | 16 | 9 | 7 | 8 | 8 | 6.5 |
| Na$_2$O | | | | 2 | 1 | 1 | 1 | |
| B$_2$O$_3$ | | | | 1 | 1 | 1 | | 5.5 |
| BaO | | | | | | | 4 | |
| ZnO | | | | | | | | 10 |
| Pb concentration, parts per million | 1.1 | 1.5 | 0.5 | 13 | 60 | 63 | 50 | 250 |

From these results it is apparent that silica contents below about 16 percent by weight result in appreciably higher lead release under acidic attack and that the presence of even small amounts of the B$_2$O$_3$ or ZnO found in previous glazes markedly increases the lead release thereof as compared with the glazes of my invention. Example 25 of Table IV, which has the composition of Example III in U.S. Pat. No. 3,488,216 describing some previous lead titanate enamels, has a lead release over 15 times that of the least durable glazes of my invention.

What is claimed is:

1. A glass enamel suitable for glazing glass-ceramic articles having a coefficient of thermal expansion below about 30 × $10^{-7}$/AL C., consisting essentially, in weight percent on the oxide basis as calculated from the batch, of about 62–68% PbO, 12–16% TiO$_2$, 14–20% SiO$_2$, and 2–4% Al$_2$O$_3$, said enamel having a coefficient of thermal expansion in the range from about 15–30 × $10^{-7}$/° C. and containing not more than a total of 2 percent by weight of additions of B$_2$O$_3$, ZnO, BaO, and P$_2$O$_5$.

2. An enamel according to claim 1 containing at least one constituent in the indicated proportion selected from the group consisting of 0–2% CaO, 0–1% Fe$_2$O$_3$, 0–1% CoO and 0–4% SnO$_2$, and wherein the SiO$_2$ content is reduced by an amount equal to the SnO$_2$ content.

* * * * *